United States Patent [19]
Kohno et al.

[11] Patent Number: 4,856,765
[45] Date of Patent: Aug. 15, 1989

[54] SPRING APPARATUS

[75] Inventors: Masahiro Kohno, 1-506, Minamikosugaya-Jutaku, 2000-10, Kosugaya-cho, Totsuka-ku, Yokohama-shi; Akira Obata, Kamakura; Takayuki Kitamura, Yokosuka; Kakuma Okazaki, Yokohama, all of Japan

[73] Assignees: Masahiro Kohno; Japan Aircraft Mfg., Co., Ltd., both of Yokohama, Japan

[21] Appl. No.: 105,599

[22] Filed: Oct. 5, 1987

[30] Foreign Application Priority Data

Oct. 9, 1986 [JP] Japan .................. 61-240322
Oct. 9, 1986 [JP] Japan .................. 61-240330

[51] Int. Cl.⁴ .................................. F16F 1/06
[52] U.S. Cl. .......................... 267/166; 5/261; 52/108; 52/646; 267/169; 267/170; 267/178; 267/179
[58] Field of Search .......... 267/173, 172, 166–171, 267/174–180, 287, 91–101, 28, 29, 194, 286–291, 275, 148, 194, 273, 285, 154–157, 131–133, 166.1; 239/265.19, 265.11; 52/111, 121, 117, 632, 645, 108, 646; 248/624, 625; 29/173, 227; 5/247; 297/307, 345; 272/52; 187/24–25; 244/159, 173

[56] References Cited

U.S. PATENT DOCUMENTS

| | | | |
|---|---|---|---|
| 1,905,498 | 4/1933 | Pfeiffer | 267/180 X |
| 2,299,687 | 10/1942 | FArrand | 52/108 |
| 2,597,650 | 5/1952 | Maehren | 267/166.1 |
| 2,673,084 | 3/1954 | Blythe | 267/287 X |
| 2,836,912 | 6/1958 | Ranucci | 267/154 X |
| 2,864,389 | 12/1958 | Smith . | |
| 2,932,832 | 4/1960 | Levine | 5/261 |
| 3,068,477 | 12/1962 | Tennyson | 52/108 X |
| 3,069,841 | 12/1962 | Moore | 239/265.19 |
| 3,081,083 | 3/1963 | Gregory | 187/25 X |
| 3,194,522 | 7/1965 | Azneer | 248/624 X |
| 3,256,594 | 6/1966 | Howard et al. | 267/177 X |
| 3,263,982 | 8/1966 | Kersavage | 267/180 |
| 3,312,020 | 4/1967 | Schuster | 52/108 |
| 3,439,467 | 1/1967 | Partlow . | |
| 3,474,579 | 10/1969 | Kieser . | |
| 3,486,279 | 12/1969 | Webb . | |
| 3,591,161 | 7/1971 | Scheublein, Jr. et al. | 267/287 |
| 3,622,142 | 11/1971 | Lorio | 267/287 |
| 3,649,000 | 3/1972 | Desy | 267/168 X |
| 3,773,309 | 11/1973 | Carter | 267/287 |
| 3,947,008 | 3/1976 | Mullins | 267/125 X |
| 4,098,498 | 7/1978 | DaSilva | 267/287 |
| 4,334,391 | 6/1982 | Hedgepeth et al. . | |
| 4,358,098 | 11/1982 | Zapletal et al. | 267/101 |
| 4,433,758 | 2/1984 | Crossman | 188/196 R |
| 4,480,415 | 11/1984 | Truss | 52/108 |
| 4,532,742 | 8/1985 | Miura . | |
| 4,587,777 | 5/1986 | Vasques et al. | 52/108 |
| 4,614,333 | 9/1986 | Gaylord | 267/287 |
| 4,635,820 | 1/1987 | Marshall | 187/24 X |
| 4,637,192 | 1/1987 | Brown | 52/646 X |
| 4,640,500 | 2/1987 | Shiau | 267/179 |
| 4,651,589 | 3/1987 | Lambert | 52/108 X |
| 4,655,022 | 4/1987 | Natori | 52/108 X |
| 4,658,560 | 4/1987 | Beaulieu | 52/646 |
| 4,662,130 | 5/1987 | Miura et al. . | |
| 4,667,451 | 5/1987 | Onoda . | |
| 4,677,803 | 7/1987 | Mikulas, Jr. et al. | 52/108 X |
| 4,687,022 | 8/1987 | Iverson | 267/172 X |

FOREIGN PATENT DOCUMENTS

| | | | |
|---|---|---|---|
| 2062946 | 12/1971 | Fed. Rep. of Germany | 52/646 |
| 85/02434 | 6/1985 | PCT Int'l Appl. | 52/108 |
| 0082948 | 3/1919 | Switzerland | 5/261 |
| 0911076 | 3/1982 | U.S.S.R. | 267/154 |

*Primary Examiner*—Douglas C. Butler
*Attorney, Agent, or Firm*—Frishauf, Holtz, Goodman & Woodward

[57] ABSTRACT

A spring apparatus has a spring body including a plurality of elastic longitudinal beam members and a coupling beam member for holding the elastic longitudinal beam members at a predetermined interval. The apparatus further has a pair of spring retaining members for supporting the both ends of the spring body, and a rotary member rotatable provided around the central axis of the spring body as a center at least one one spring retaining member. At least one of the elastic longitudinal beam member is provided at one end of the rotary member. This spring apparatus is a tightly wound coil and made of the elastic longitudinal beam members in fully compressed state. When extended, each elastic longitudinal beam member is sequentially spirally deformed at larger pitch from the end. The twisting deformation of the elastic longitudinal beam member is released by rotation of the rotary member.

20 Claims, 13 Drawing Sheets

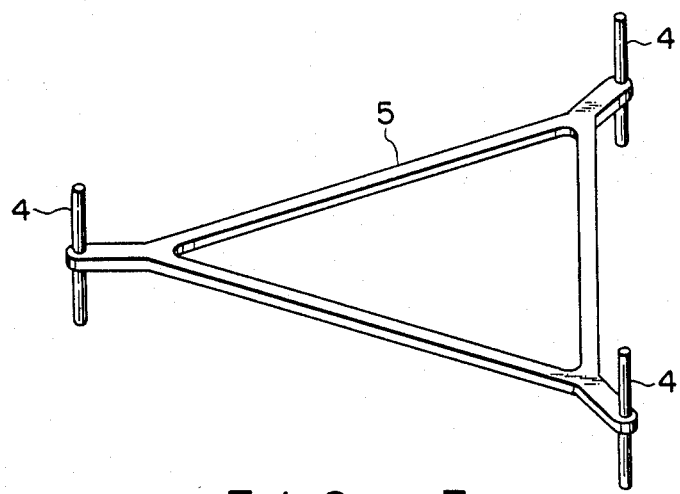
F I G. 3
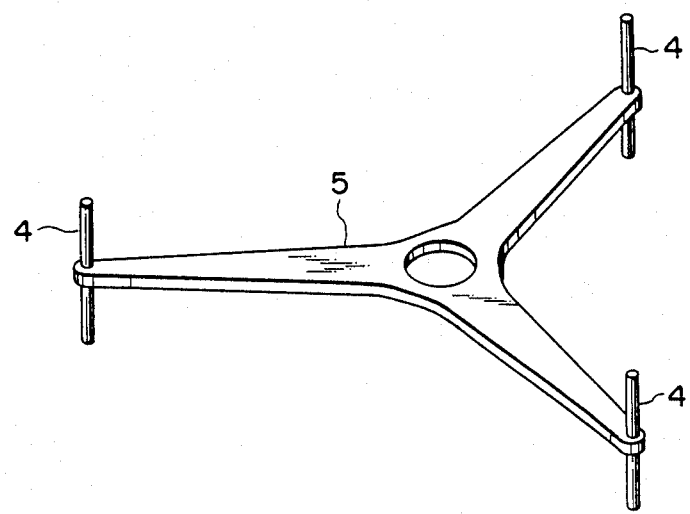
F I G. 4

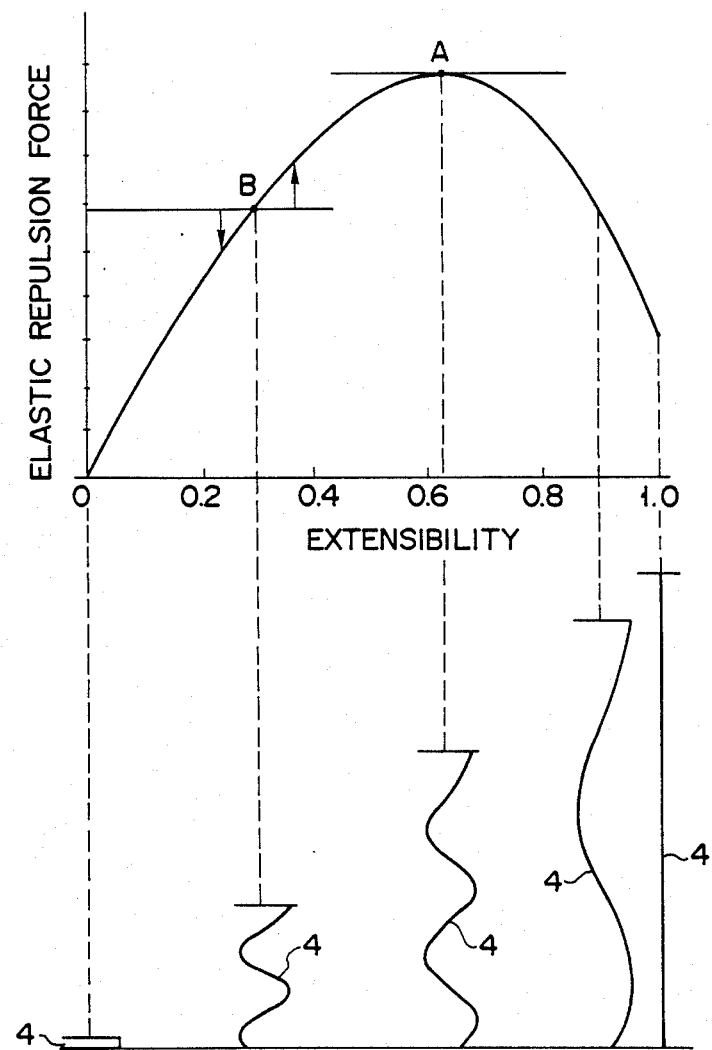
F I G. 10

SPRING APPARATUS

BACKGROUND OF THE INVENTION

The present invention relates to a spring apparatus and a product employing the spring apparatus and, more particularly, to a spring apparatus having an extremely long extensible and contractible stroke and being capable of obtaining substantially constant repulsion force over the entire stroke, and also to a product utilizing the characteristics of the spring apparatus.

A compression coiled spring has heretofore been frequently used. Its extensible stroke is relatively short, and variations in its repulsion force are large over the entire stroke. This drawback become prominent when the spring is used as a spring apparatus in a special product.

For example, in an apparatus for lifting a heavy load, it is preferable to support the heavy load by the repulsion force of the compression coiled spring. In this case, the above-mentioned drawback results in great defects. The drawback also brings forth great disadvantages when the compression coiled spring is used as an actuator in various types of devices used in outer space. More specifically, since the stroke of the spring is short, the entire spring must be large and heavy to obtain a necessary stroke. Since the variations in the repulsion force of the spring is large in the entire stroke, structural members and a latch mechanism for holding the spring in a compressed state must be designed to endure the maximum repulsion force of the spring, and must therefore be large and heavy.

Heretofore, to eliminate or diminish the above-mentioned drawback of the spring, various types of techniques have been developed. These techniques reside in improving the properties of materials of the spring, for example, by increasing the elastic limit of the spring and by using light materials. However, the improvement of the material properties is insufficient.

SUMMARY OF THE INVENTION

An object of the present invention is to provide a compression coiled spring apparatus which has a large extensible stroke and less variations in its repulsion force over the entire extensible and contractible stroke.

According to the present invention, there is provided a spring apparatus, comprising a spring body having a plurality of elastic longitudinal beam members and a coupling beam member for holding the elastic longitudinal beam members at a predetermined interval, a pair of spring retaining members for supporting the both ends of the spring body, wherein the elastic longitudinal beam members are spirally bent, and one end of the elastic longitudinal beam members is rotatably mounted on one spring retaining member, a rotary member rotatable around the central axis of the spring body as a center and provided at the other spring retaining member so that the other end of the elastic longitudinal beam member is rotatably secured to the rotary member.

In the spring apparatus described above, the elastic longitudinal beam members are so wound in a coiled shape as to be substantially closely contacted with each other in a fully compressed state. When the spring apparatus extends, the elastic longitudinal beam members are sequentially deformed from the ends in spiral shapes of larger pitches. More particularly, when the conventional coiled spring is extended or contracted, the spring is simultaneously deformed at the same pitch over the entire length. On the other hand, in the spring apparatus of the invention, the portion of the elastic longitudinal beam member near the end is deformed in spiral shape of larger pitch, the next portion adjacent to the portion of the elastic longitudinal beam member extends to assume the spiral shape of a predetermined pitch after the portion is deformed in the spiral shape of the predetermined pitch, and the elastic longitudinal beam member is sequentially deformed from the end in the spiral shape of a larger pitch. The coupling beam member maintains the interval between the elastic longitudinal beam members constant, thereby to control the deformation so that the elastic longitudinal beam member has a coiled shape of a predetermined diameter. When the coiled spring body made of the elastic longitudinal beam members is extended or contracted, the spring body is twisted to be deformed at the central axis as a center, and the twisting deformation is opened when the rotary member is rotated.

This spring apparatus has properties different from those of the conventional coiled spring, due to the above-described operating principle, and can have a long extensible stroke and maintain the repulsion force substantially constant over the entire stroke.

BRIEF DESCRIPTION OF THE DRAWINGS

FIGS. 3 to 6 are perspective views showing different examples of coupling beam members;

FIG. 10 is a diagram showing the properties of the elastic longitudinal beam member assuming that the members are uniformly deformed;

DETAILED DESCRIPTION OF THE PREFERRED EMBODIMENTS

An embodiment of a spring apparatus according to the present invention will be described in detail with reference to the accompanying drawings.

Figure 1A:
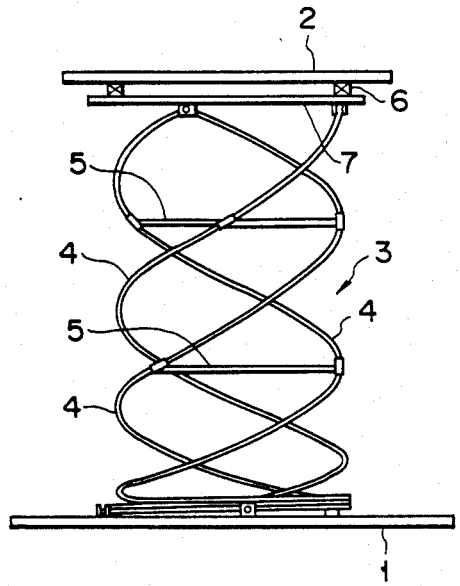
FIGS. 1a and 1b are side views showing the midway of extended state and fully extended state of an embodiment of a spring apparatus according to the present invention.
Figure 1B:
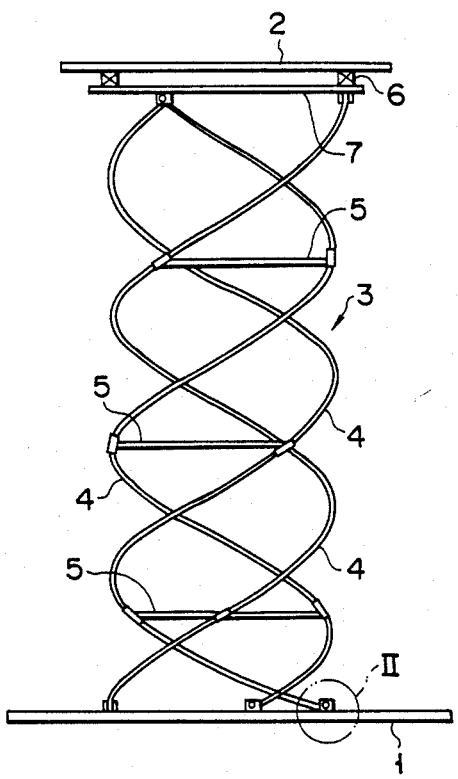
Figure 2:
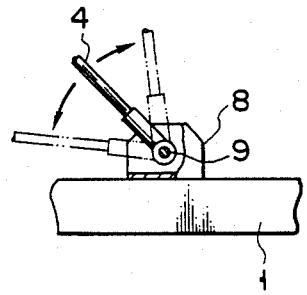
FIG. 2 is an enlarged view of the portion II of FIG. 1b.
Figure 5:
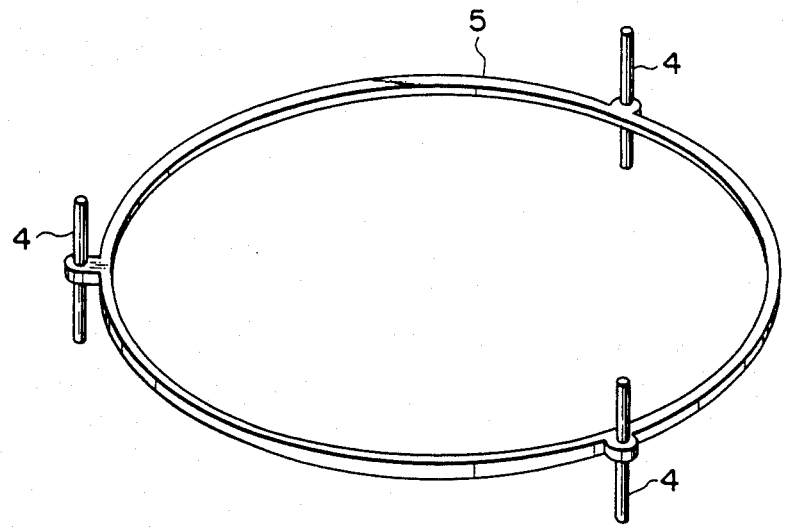

In FIGS. 1a and 1b, the spring apparatus comprises spring body 3 provided between a pair of upper and lower disc-like spring retaining members 2 and 1. Spring body 3 has a plurality (e.g., 3) of elastic longitudinal beam members 4 and 4 having the same length, and a plurality of coupling beam members 5 and 5 for coupling elastic longitudinal beam members 4 and 4. Elastic longitudinal beam members 4 and 4 are formed of an elastic wire blank such as a glass fiber- or carbon-reinforced epoxy resin. Elastic longitudinal beam members 4, 4 are pivotally secured at their lower ends at an equal interval along the outer peripheral edges of lower spring retaining member 1. Elastic longitudinal beam members 4, 4 are pivotally secured at their upper ends at an equal interval along the outer peripheral edge of a rotary member, i.e., turntable 7 rotatably provided through a bearing 6 on the lower surface of upper spring member 2. FIG. 2 shows the pivotally securing structure of elastic longitudinal beam member 4 to lower spring retaining member 1. Longitudinal beam member 4 is pivotally secured at its lower end to pivoting fitting 8 provided on the upper surface of lower spring retaining member 1 tiltably in the circumferential direction of the spring retaining member by pin 9, and the upper end of longitudinal beam member 4 is similarly pivotally secured to turntable 7.

Figure 6:
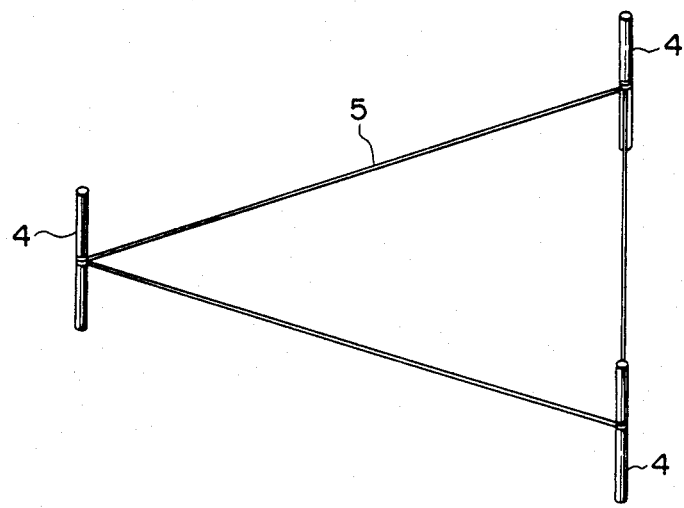

Coupling beam members 5, 5 are provided at an equal interval longitudinally of spring body 3. FIGS. 3 to 6 show different examples of coupling beam member 5, which is formed of synthetic resin, and coupling beam member 5 in FIG. 6 is formed of a fiber cable having high tension resistance. Coupling beam members 5, 5 couple elastic longitudinal beam members 4, 4 with each other to so restrict elastic longitudinal beam members 4, 4 as not to swell nor deform to the outer peripheral side of spring body 3. Coupling beam member 5 in FIGS. 3 to 5 so restricts that elastic longitudinal beam members 4, 4 may not bend to be deformed to the inner peripheral side of spring body 3.

Figure 7:
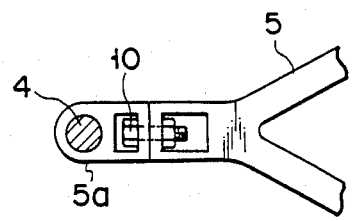
FIGS. 7 to 9 are plan views of different examples of coupling structure of coupling beam members and elastic longitudinal beam member.
Figure 8:
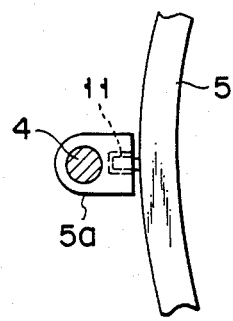
Figure 9:
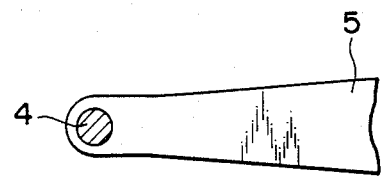
Figures 11A, 11B:
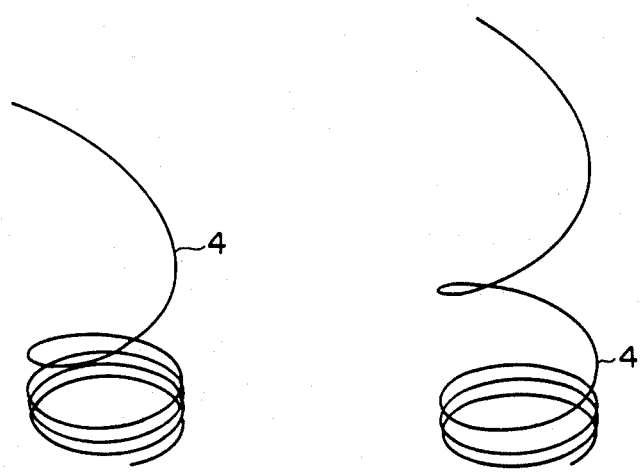
FIGS. 11a to 11d are perspective views showing the actually extended states of the elastic longitudinal beam members.
Figures 11C, 11D:
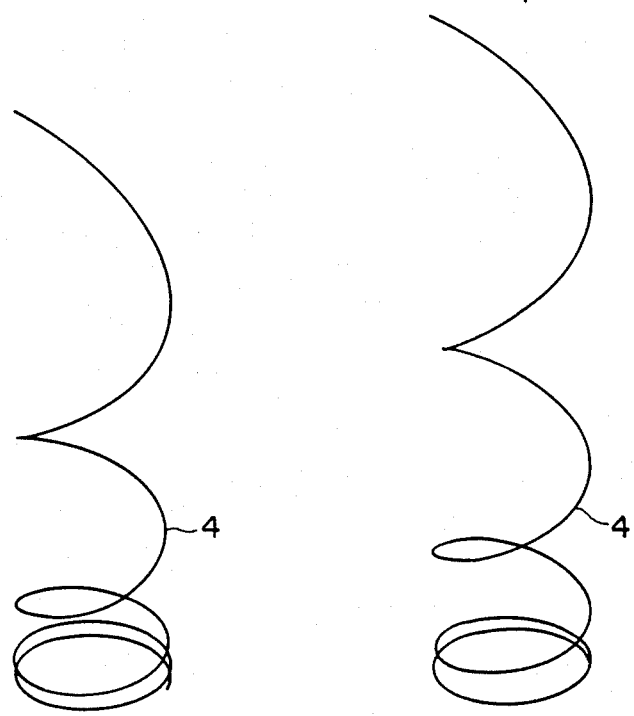

Spring body 3 contracts while spirally elastically deforming elastic longitudinal beam members 4, 4 and extends by the elasticity of elastic longitudinal beam members 4, 4. When an axial compression force is applied to spring body 3 in the state that elastic longitudinal beam members 4, 4 are extended substantially rectilinearly, i.e., in the initial state that spring body 3 is extended mostly, elastic longitudinal beam members 4, 4 are deflected to be deformed by the compression force, but since longitudinal beam members 4, 4 are coupled by coupling members 5, 5, longitudinal beam members 4, 4 are deflected to be deformed only circumferentially of spring body 3. Thus, longitudinal beam members 4, 4 are spirally deformed as shown in FIG. 1a while turning turntable 7. In this case, when the initial attitudes of longitudinal beam members 4, 4 are slightly inclined toward spirally deforming direction or turntable 7 is slightly turned at the initial time of compression, longitudinal beam members 4, 4 can be smoothly spirally deformed. The spiral deformations of longitudinal beam members 4, 4 are proceeded while increasing the number of turns as shown in FIG. 1b as spring body 3 is being continuously compressed, and the windings of longitudinal beam members 4, 4 eventually spirally deformed are superposed to each other. When the compression force applied to spring body 3 is released, elastic longitudinal beam members 4, 4 are recoiled from closely coiled state while turning turntable 7 reversely to that at compressing time by recoiling strengths of elastic longitudinal beam members 4, 4, and eventually returned to the most extended state that longitudinal beam members 4, 4 are substantially rectilinearly extended to be erected vertically. A twisting force is operated at coupling portions of coupling beam members 5, 5 as elastic longitudinal beam members 4, 4 are spirally deformed, i.e., the angles of the longitudinal beams are varied. This twisting force can be released by pivotally securing coupling portion 5a of coupling beam member 5 rotatably to coupling beam member 5 by bolt 10 or pin 11 with coupling portion 5a of coupling beam member 5 separately provided as shown in FIGS. 7 and 8. When coupling beam member 5 itself is incorporated with a twistable elasticity, the twisting strength can be absorbed even if coupling beam member 5 and its coupling portion are integrated as shown in FIG. 8. This spring apparatus has such properties that large extensible and contractible strokes can be provided, and substantially constant repulsion force is provided over the entire length of the extensible and contractible strokes.

The repulsion force of this spring apparatus will be described with respect to that of one elastic longitudinal beam member 4. Elastic repulsion force P when elastic longitudinal beam member 4 is spirally deformed is obtained by differentiating its strain energy by a variation in the length, and can be formulated as below.

$$P = 4/D^2 \cdot x/L \{2EI(1-(x/L)^2) GH(2(x/L)^2 - 1)\}$$

where
  D: the diameter of spring body 3
  x/L: extensibility (=0 at completely compressed time, =1 at completely extended time)
  EI: bending rigidity of longitudinal beam member 4
  GJ: twisting rigidity of longitudinal beam member 4

FIG. 10 shows calculated result of extensibility and elastic repulsion force of elastic longitudinal beam member 4 according to the above formula, where the repulsion force is obtained by assuming that elastic longitudinal beam member 4 is spirally deformed uniformly over the entire length. As apparent from FIG. 10, the elastic repulsion force becomes maximum in the state that elastic longitudinal beam member 4 is extended in a predetermined extensibility, i.e., pitch (point A). It is noted that the decreasing rate of the elastic repulsion force, for example, near point B in a range that the extensibility is larger than point A is larger than that of a range that the extensibility is smaller than point A. Therefore, when the elastic longitudinal beam member of compressed state starts extending, the elastic longitudinal beam member is not extended uniformly over the entire length, but is extended partly, i.e., only at the portion near the end at the extensibility corresponding to point A. There occurs a portion that the extensibility is continuously varied between the end extended to point A and a portion that is still compressed. When the elastic longitudinal beam member is further extended, before the portion extended to point A is further extended, the portion that the extensibility is smaller from point A is preferentially extended at the extensibility corresponding to that at point A.

Therefore, the extending behavior of elastic longitudinal beam member 4 from spirally compressed state when longitudinal beam member 4 is sufficiently long may be described as below. When longitudinal beam member 4 compressed in closely contacted spiral state is extended from this state, longitudinal beam member 4 is gradually extended from its one end, and stabilized at extensibility (which is balanced with a load) corresponding to point A. When one end of the longitudinal beam member arrives at stabilized state, longitudinal beam member is not extended any further, and longitudinal beam member 4 is sequentially extended from closely contacted spiral state from its end. This state is schematically shown in FIGS. 11a to 11d, and elastic longitudinal beam member 4 is extended sequentially from FIGS. 11a, then 11b, 11c to 11d.

Figure 12:
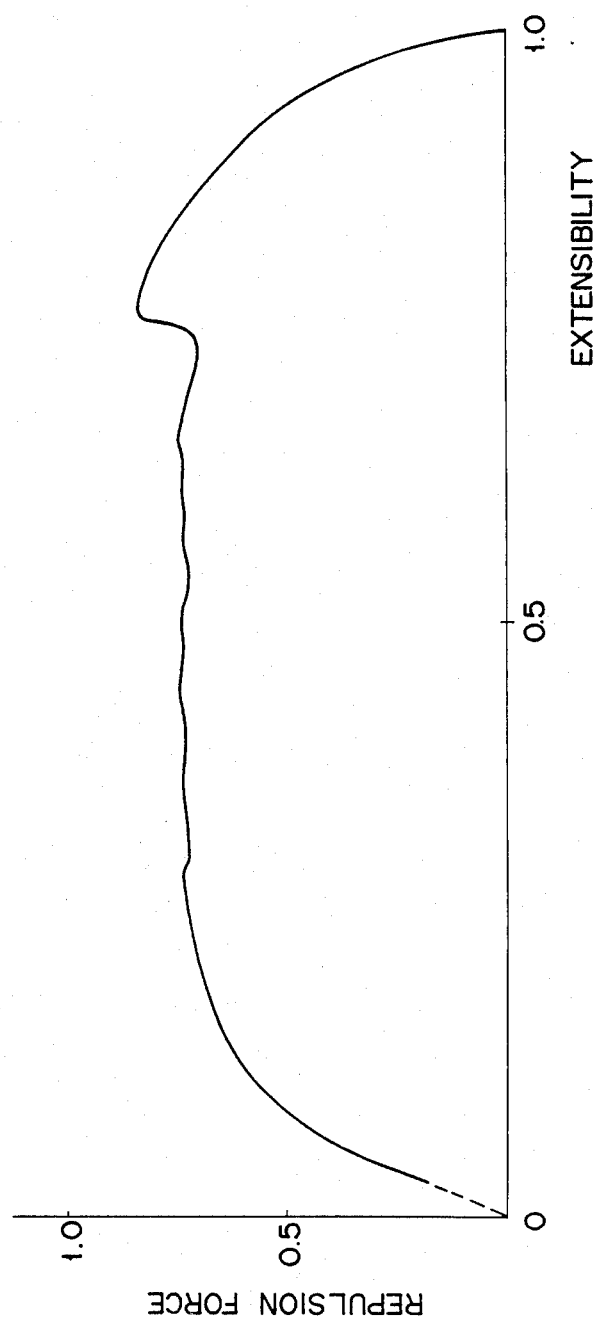
FIG. 12 is a diagram showing the properties of the spring apparatus of the invention.
Figure 13:
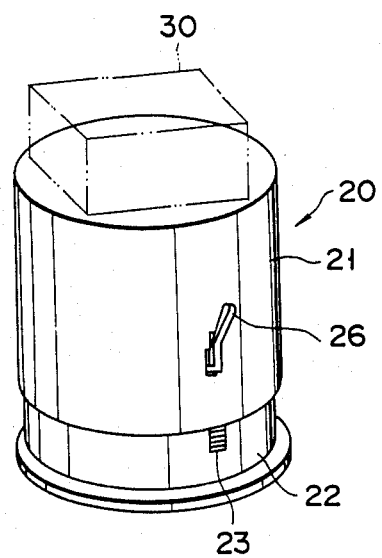
FIG. 13 is a perspective view of an elevator using the spring apparatus of the invention.
Figure 14:
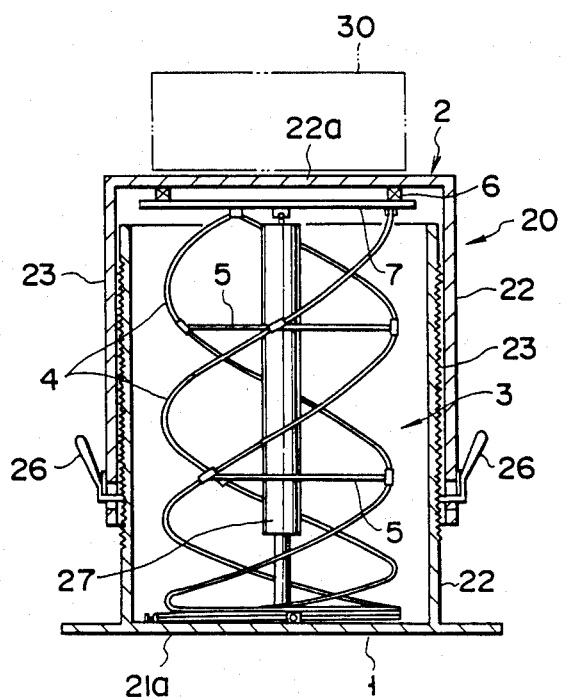
FIGS. 14 and 15 are longitudinal sectional views of the contracted and extended states of FIG. 13.
Figure 15:
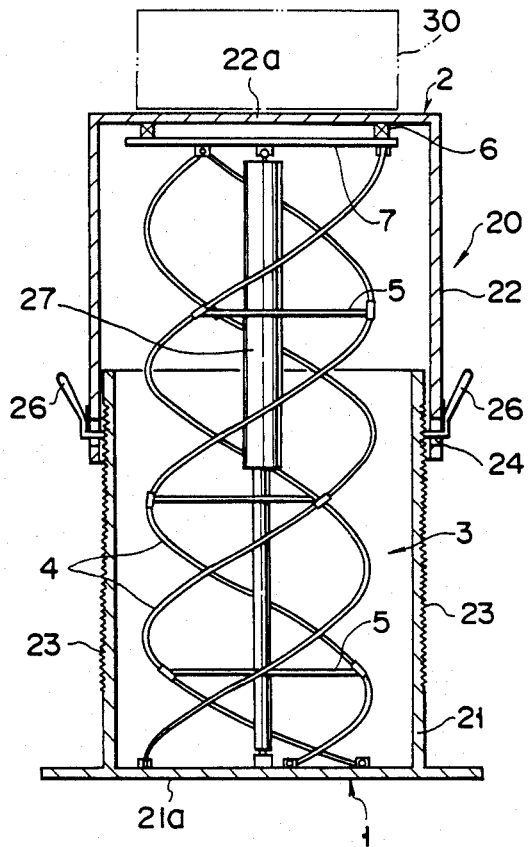

FIG. 12 shows the relationship between the extensibility and the repulsion force of the spring apparatus which is extended by the extending behavior of elastic longitudinal beam members 4 described above, where the repulsion force of the spring apparatus in which 3 elastic longitudinal beam members 4 made of fiber-reinforced synthetic resin wire blank having 1.5 mm in diameter are used and the diameter of spring body 3 at minimum compression time is designed to become 150 mm. As apparent from FIG. 12, the spring apparatus exhibits substantially constant repulsion force even in any extensibility except the vicinities of the minimum compression and the maximum extension.

Therefore, according to the spring apparatus, substantially constant repulsion force can be obtained over the long stroke. The repulsion force of this spring apparatus can be arbitrarily set by selecting the number of elastic longitudinal beam members 4, 4 and the diameter of longitudinal beam member.

Then, a product which employs the spring apparatus will be described. FIGS. 13 to 16 show an elevator for elevating a heavy load by utilizing the spring apparatus as described above. This elevator has case 20. Case 20 has lower cylindrical case 21, and upper case 22 elevationally movably engaged with the outside of lower case 21. Upper case 22 is guided by guide rails, not shown, provided on the outer periphery of lower case 21 to elevate without rotating in the circumferential direction. Bottom plate 21a which is also used as lower spring retaining member 1 is provided at the lower end of lower case 21, and ceiling plate 22a for placing heavy load which is used also as upper spring retaining member 2 is provided at the upper end of upper case 22. Turntable 7 is mounted through bearing 6 on the lower surface of ceiling plate 22a. Above-mentioned spring body 3 is provided in case 20. The lower ends of elastic longitudinal beam members 4, 4 of spring body 3 are pivotally secured to bottom 21a of lower case 21, and the upper ends of longitudinal beam members 4, 4 are pivotally secured to turntable 7 provided under ceiling plate 22 of upper case 22.

Figure 16:
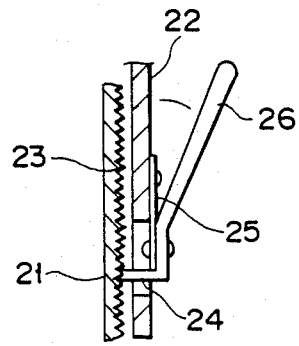
FIG. 16 is an enlarged view of a locking mechanism of the apparatus of FIG. 13.

Racks 23, 23 are formed over the entire height at both side of the outer periphery of lower case 21, and locking pawls 24, 24 for locking upper case 22 in arbitrary elevation height are engaged with racks, 23, 23 at both sides of upper case 22 at lower end. Locking pawl 24 is attached to end of leaf spring 25 secured at base end to lower case 21 as shown in FIG. 16, engaged with rack 23 by the elastic strength of leaf spring 25, and released from rack 23 by pressing lock releasing lever 26 integral with locking pawl 24 toward case 20 side. Damper 27 is provided to regulate elevating speed of upper case 22 for safety remedy in case that upper case 22 is unlocked.

This elevator is used, for example, to elevate up or down a load on a rack in a warehouse. When the load is raised on the rack, the elevator is approached to the rack, placed on a floor, upper case 22 is moved down to the lower limit, then locked, and load 30 is then placed on ceiling plate 22a. Then, lock releasing arms 26, 26 are manually pushed to case 20 side to release locking pawls 24, 24 from racks 23, 23 to lease upper case 22, upper case 22 is then raised. In this case, when the weight of load 30 is smaller than the repulsion force of spring body 3, upper case 22 is raised by the repulsion force of spring body 3 to lift load 30. Lock releasing levers 26, 26 may be continuously pressed while upper case 22 is being raised. When load 30 is excessively light, upper case 22 tends to rise at high speed, but the rising speed of upper case 22 is decelerated by damper 27. When the weight of load 30 is larger than the repulsion force of spring body 3 so that upper case 22 does not rise only by the repulsion force of spring body 3, lock releasing levers 26, 26 are raised while pressing lock releasing levers 26, 26 to raise upper case 22. In this case, since the repulsion force of spring body 3 acts to lift upper case 22, upper case 22 can be raised by small force to lift load 30 on upper case 22. When stopping rising of upper case 22, lock releasing levers 26, 26 may be released when upper case 22 rises so that ceiling plate 22a becomes substantially the same level as rack. When lock releasing levers 26, 26 are released, locking pawls 24, 24 are engaged with racks 23, 23 by the elastic tension of leaf spring 25 so that upper case 22 is locked in the height at that time. Thus, load 30 on upper case 22 is laterally moved thereafter to transfer load 30 on the rack. When unloading the load on the rack, upper case 22 is raised, contrary to the above, to the height of the rack to be locked, load 30 is transferred on the rack on ceiling plate 22a, lock releasing arms 26, 26 are thereafter pushed to release locked upper case 22. In this case, when the weight of load 30 is larger than the repulsion force of spring body 3, spring body 3 is compressed by the weight of load 30 to lower upper case 22. Even in this case, when load 30 is excessively heavy so that upper case 22 tends to move down at high speed, the lowering speed of upper case 22 is decelerated by damper 27. When the weight of the load is smaller than the repulsion force of spring body 3 so that upper case 22 tends to, contrary to the above, rise, lock releasing levers 26, 26 may be pulled while pressing lock releasing levers 26, 26 to lower upper case 22. In this case, the weight of load 30 is supported by the repulsion force of spring body 3. Thus, load 30 can be moved down by small force.

In the spring apparatus described above, it is necessary to suppress the diameters of elastic longitudinal beam members 4, 4 to approx. 1/100 of the diameter of spring body 2 due to the deforming property of elastic longitudinal beam members 4, 4. Thus, the maximum lifting weight of the elevator which uses spring body 3 having, for example, 30 cm in diameter is approx. 100 kg.

The spring apparatus can be used not only in an elevator for a load, but also in an elevational stand for an installation type television camera or an extensible legs of a chair. When the loading weight is decided like the elevational stand of the installation type television camera, the repulsion force of the spring apparatus is set to balance with the bearing weight to elevationally move the camera with an extremely small force. When the spring apparatus is used at extensible legs of the chair, a fine height adjustment can be performed by releasing the lock by slightly floating a waist of a person sitting on the chair. The spring apparatus can be used laterally. Further, in the embodiment described above, one of a pair of spring retaining members 1, 2 has been provided at turntable 7. However, the turntables may be provided at both spring retaining members to be pivotally secured at both ends of elastic longitudinal beam members 4, 4 to the turntables.

The spring apparatus of the present invention can be used as an actuator of a rocket nozzle unit by utilizing the features.

In the rocket motors of second and third stage rockets of multi-stage rocket apparatus or kick motors of an artificial satellite, irreversibly contracted nozzle unit is folded, rocket nozzles are folded at launching time to improve containing efficiency. There is as this folding type rocket nozzle unit an arrangement that the nozzles are axially divided into a plurality of division pieces, which are superposed at launching time, and biaxially moved by an actuator at rocket firing time to extend the nozzles. Heretofore, the conventional actuator has employed an arrangement that a screw rod is rotated by a driving mechanism to move a nut engaged with the screw rod. However, this actuator has drawbacks that its weight is heavy and its structure is complicated.

Figure 17:
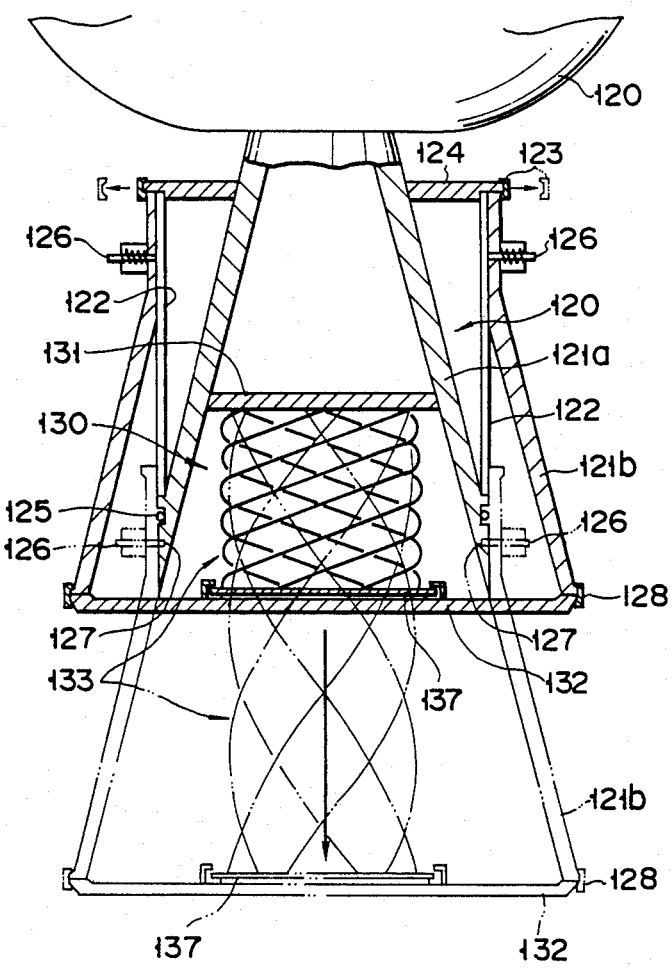
FIG. 17 is a longitudinal sectional view of a rocket nozzle unit using the spring apparatus of the invention.
Figure 18:
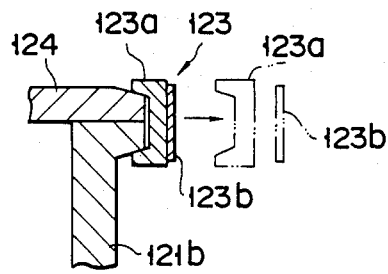
FIG. 18 is an enlarged view of a storage clamping unit of the apparatus of FIG. 17.
Figure 19:
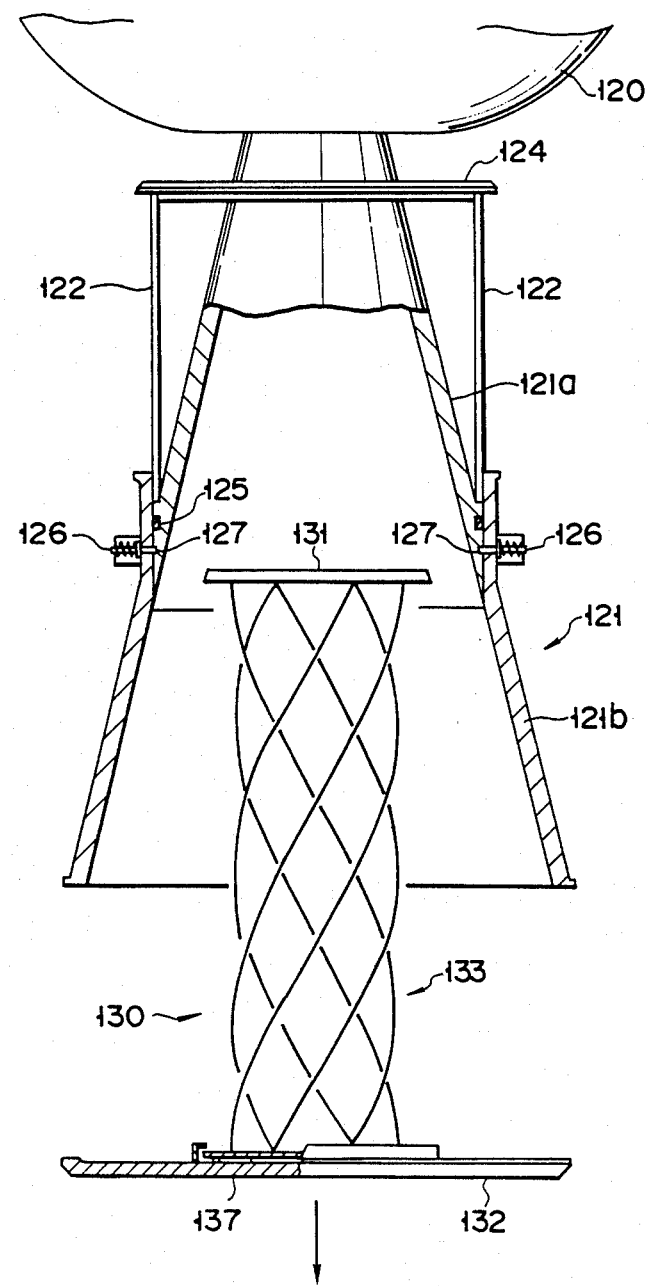
FIG. 19 is a longitudinal sectional view of the disconnected state of the rocket nozzle unit of FIG. 17.

The spring apparatus of the invention can be used as an actuator of a folding type rocket nozzle unit to construct a simple and light actuator. FIGS. 17 to 19 show an example of the actuator by employing the spring apparatus of the invention.

In FIG. 17, a folding type rocket nozzle unit has rocket motor or motor body 120 of a kick motor for a satellite, and nozzle 121 provided at the injection port of motor body 120. Nozzle 121 is split into a small-diameter side stationary nozzle 121a fixed to the injection port of motor body 120 and a large-diameter side movable nozzle 121b. Movable nozzle 121b is guided by a plurality of vertical guide rails 122, 122 provided at an equal interval on the outer periphery of nozzle 121a to move axially of the nozzle. Movable nozzle 121b is stored in the enclosure of stationary nozzle 121a as shown by soled lines in FIG. 17, is moved along guide rails 122, 122 after a lower stage motor is disconnected to extend in the state continuous with stationary nozzle 121a under stationary nozzle 121a.

This rocket nozzle unit also has a storage clamper 123 for clamping movable nozzle 121b stored in the enclosure of stationary nozzle 121a in a storage state. Clamper 123 is secured to the outer periphery of upper end of stationary nozzle 121a to hold a movable nozzle latch plate 124 fixed to the outer periphery of upper end of stationary nozzle 121a for supporting the upper ends of guide rails 122, 122 and a collar formed on the outer periphery of upper end of movable nozzle 121b from the outer periphery as shown in FIG. 18 to fix movable nozzle 121b to movable nozzle latch plate 124. This storage clamper 123 is formed of a plurality of divided clamp rings 123a, and a tightening band 123b of leaf spring for clamping clamping rings 123a from the outer periphery. Clamping band 123b is cut by explosives provided at one or a plurality of positions of tightening band 123b when movable nozzle 121b is extended. When clamping band 123b is disconnected, divided clamp rings 123a are released by the clamping force from the outer periphery to be released from movable nozzle latch plate 124 and movable nozzle 121b as designated by chain lines in FIG. 17 to release the clamp of movable nozzle 121b.

In FIG. 17, this rocket nozzle unit has a spring apparatus 130 of this invention for pressing movable nozzle 121b provided in stationary nozzle 121a for extending movable nozzle 121b. Movable nozzle 121b stored in the enclosure of stationary nozzle 121a is moved to the state indicated by broken lines in FIG. 17 by the pressing force of spring apparatus 130, i.e., nozzle extending state by releasing the clamp.

In FIG. 17, rocket nozzle unit also has O-rings 125 for sealing the slidably contacting portion of the outer periphery of the lower end of stationary nozzle 111a with the inner periphery of upper end of movably extended nozzle 11b, and a plurality of locking pins for locking movably extended nozzle 121b to home position. Locking pins 126, 126 are provided at movable nozzle 121b and pressed to the inner peripheral side of movable nozzle 121b by spring tension to move together with movable nozzle 121b while slidably contacting with guide rails 122, 122 to be engaged with locking openings 127, 127 formed at stationary nozzle 121a.

The spring apparatus 130 described above comprises upper disc-like spring retaining member 131 supported by the wall of stationary nozzle 121 at the outer peripheral edge in contact with oblique wall of stationary nozzle 121b from below, lower spring retaining member 132 provided separably at the lower end of movable nozzle 121b, and spring body 133 provided in compressed state between upper and lower spring retaining members 131 and 132. Lower spring retaining member 132 is formed in a disc shape for blocking lower end opening surface of movable nozzle 121b, and clamped to movable nozzle 121b by similar clamper 128 to storage clamper 123.

In the nozzle unit described above, spring apparatus 130 is set to the magnitude which can press to move movable nozzle 121b by the repulsion of spring body 130 (in which the repulsion of spring body 133 is arbitrarily set by selecting the number of elastic longitudinal beam members 134, 134 and the diameter of longitudinal beam member 134), the maximum extending length of spring body 130 is sufficiently increased as compared with the extending moving distance of movable nozzle 121b, and spring apparatus 130 is installed in the state that spring body 133 is compressed in a range that substantially constant repulsion force is exhibited.

Then, the extending operation of the nozzle unit will be described. Nozzle 121 is extended after the motor of lower stage is disconnected. When nozzle 121 is extended, storage clamper 123 may be released by a command from a ground control center or rocket-carried computer. When storage clamper 123 is released, movable nozzle 121b is released from clamping to extend spring apparatus 130, which is pressed to move downward through lower spring retaining member 132, movable nozzle 121b is extended to normal extending position (where is indicated by broken line in FIG. 17) along guide rails 122, 122. In this case, spring body 133 of spring apparatus 130 is extended while maintaining repulsion force constantly as described above. Therefore, movable nozzle 121b can be smoothly moved at substantially constant speed to be extended.

In this nozzle unit, since spring apparatus 130 which utilizes the extending strength of spring body 133 is used as a nozzle extending mechanism for extending movable nozzle 121b, the weight and the cost of the entire nozzle unit including nozzle extending mechanism can be reduced. Spring apparatus 130 used for extending movable nozzle 121b disconnects lower spring retaining member 132 from movable nozzle 121b to disconnect it from motor body 120 and nozzle 121 and to dispose it. Since upper spring retaining member 131 of spring apparatus 130 is contacted with oblique wall of stationary nozzle 121b from below to support the outer peripheral edge from the wall of stationary nozzle, spring apparatus 130 may be disconnected merely by releasing clamper 128 clamped to movable nozzle 21b by a command from a ground control center or a rocket-carried computer to disconnect lower spring retaining member 132 from movable nozzle 121b. Therefore, according to the nozzle unit, the nozzle extending mechanism which becomes unnecessary after the nozzle is extended can be disconnected from motor body 120 and nozzle 121 to improve motor propulsion efficiency. Further, in this nozzle unit, since the maximum extending length of spring body 130 is sufficiently longer than the extending distance of movable nozzle 121b, spring body 133 remains marginal extending strength even after completely extending movable nozzle 121b, and when lower spring retaining member 132 is disconnected from movable nozzle 121b, entire spring apparatus 130 is released to fly out by the marginal extending force of spring body 130 as shown in FIG. 19 (in this case, the repulsion force of spring body 133 is increased near the vicinity of the maximum extension, and the force for flying out spring apparatus 130 may be sufficiently obtained). Therefore, the nozzle extending mechanism formed of spring apparatus 130 may be disconnected by utilizing the energy of the extending mechanism.

Figure 20:
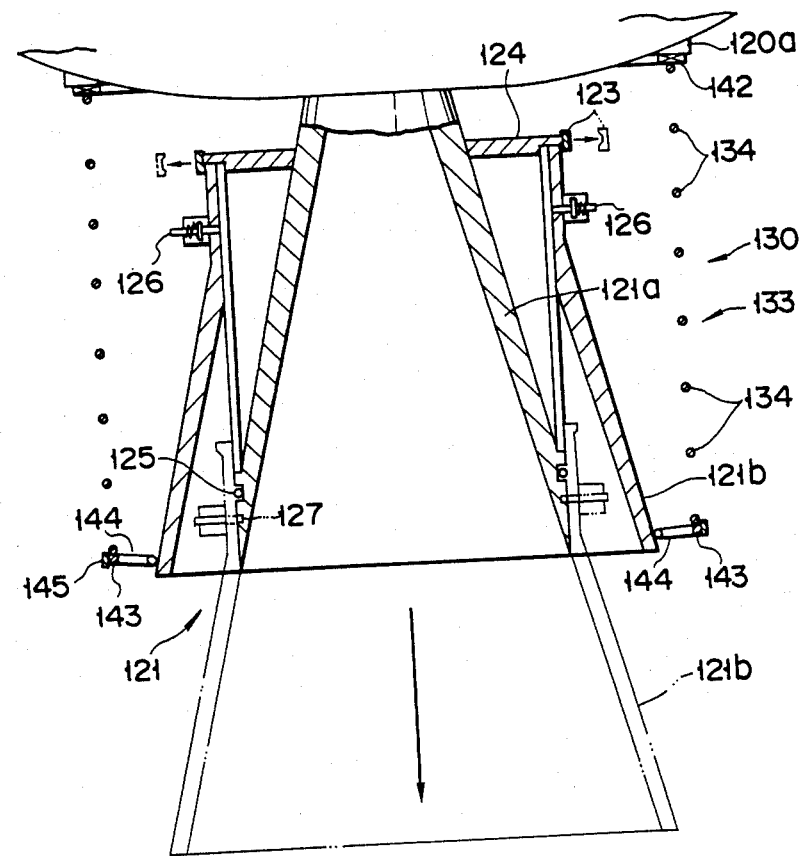
FIG. 20 is a longitudinal sectional view showing another example of the rocket nozzle unit.
Figure 21:
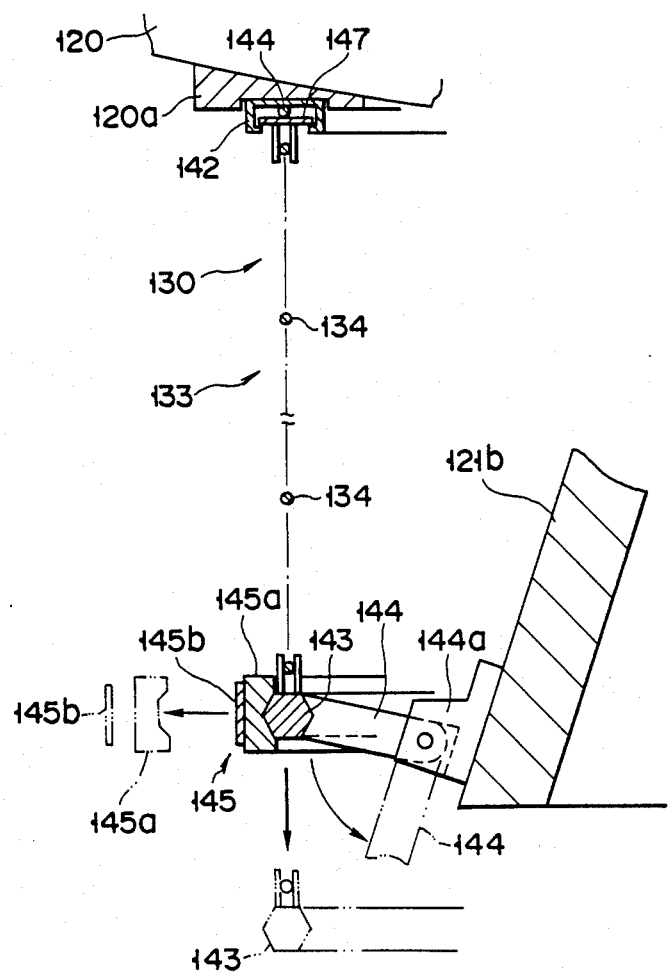
FIG. 21 is a partially enlarged view of the rocket nozzle unit of FIG. 20.

In the embodiment described above, spring apparatus 130 for extending movable nozzle 121b is provided in stationary nozzle 121a. However, spring apparatus 130 may be provided in the enclosure of movable nozzle 121b. More specifically, in FIGS. 20 and 21, another example of the rocket nozzle unit is shown. In this example, spring apparatus 130 is provided out of movable nozzle 121b. This example will be described. In FIGS. 20 and 21, this rocket nozzle unit has upper spring retaining member 142 of spring apparatus 130, and lower spring retaining member 142. Upper spring retaining member 142 is contacted from below with base member 120a fixed to the lower surface of rocket motor body 120 in a ring shape, and supported through base member 120a to the lower surface of motor body 120. Lower spring retaining member 143 is divided into a plurality of ring-shaped members to be separably engaged with ends of supporting arms 144, 144 elevationally movably provided at an equal interval on the outer periphery of lower end of movable nozzle 121b, and pressed fixedly to supporting arms 144, 144 by clamper 145 made of split clamp springs 145a and explosive disconnection type tightening band 145b. Spring body 133 employs similar to that in the example described above (but coupling beam member employs ring-shape). This spring body 133 is pivotally secured to turntable 146 rotatably provided through bearing 146 at upper spring retaining member 142 at the upper ends of elastic longitudinal beam members 134, 134, and is also pivotally secured at lower end to lower spring retaining member 143 to be compressed between upper and lower spring retaining members 142 and 143. Supporting arms 144, 144 are inclined slightly upward at the ends of the arms by the clamping force of clamper 145 so that the upper surfaces of the base end thereof is fixed to the state supported to arm mounting bracket 144a. Thus, supporting arms 144, 144 are not rotated downward by the extending strength of spring body 133 until clamper 144 is released but support lower spring retaining member 143. The same reference numerals as those in the previous embodiments denote the same or equivalent components, and the detailed description thereof will be omitted.

In the nozzle unit of this example, movable nozzle 121b is extended by the extending strength of spring apparatus 130 by releasing storage clamper 123 similarly to that in the previous example described above, and the clamp of lower spring retaining member 143 is released after the nozzle is extended to disconnect and dispose unnecessary spring apparatus 130, thereby disconnecting clamper 145 for pressing lower spring retaining member 143 fixedly to supporting arms 144, 144. Thus, split lower spring retaining members 143 are released from the tightening force to push downward spring apparatus 130 by the marginal extending force while expanding toward the outer peripheral side to rotate downward supporting arms 144, 144 as shown by broken line in FIG. 21 to release arms 144, 144. Thus, unnecessary spring apparatus 130 may be disconnected and disposed by utilizing the marginal extending force of spring body 133.

Therefore, in the nozzle unit of this example, similar advantages as those of the previous example described above can be provided. Further, in the example described above, spring apparatus 130 is provided out of nozzle 121. Thus, before nozzle 121 is extended, the motor can be fired. More specifically, the combustion efficiency of the motor is better, when the nozzle is shorter in the atmosphere, and is better, when the nozzle is longer in space. According to the nozzle unit of this example, nozzle 121 is not extended when flying in the atmosphere to burn in the motor, and nozzle 121 can be extended when entering the space. Therefore, motor can be preferably burned in preferable combustion efficiency even in the atmosphere and in space.

In the embodiment described above, a plurality of elastic longitudinal beam members 134, 134 which are spirally deformed are utilized as spring body 133 of spring apparatus 130. However, this spring body may employ an ordinary coiled spring. And clamping means and disconnecting means for upper spring retaining members 131, 142 and lower spring retaining members 122, 143 may not be limited to the particular embodiments described above.

The present invention is not limited to the particular embodiments described above. Various other changes and modifications may be made within the spirit and scope of the present invention.

What is claimed is:

1. A spring apparatus comprising:
    a plurality of elastic wire spring rods (4) forming a spring body and defining its periphery, said spring body being elongated along a given line and having two opposed ends, said rods being spaced at respective predetermined intervals around the periphery of the spring body;
    a support (1);
    first means for coupling (8) one of the opposed ends of the spring body to said support,
    at least one spacer means (5) coupled to said rods between said opposed ends for maintaining said rods spaced at certain intervals along the periphery of the spring body, said certain intervals corresponding to said respective predetermined intervals;
    a load receiving member (2);
    second means (6,7) for rotatably coupling the load receiving member to the other of the opposed ends of the spring body for rotation around an axis parallel to said given line such that a change in elongation of said spring body, in response to force applied to the load receiving member in the direction of said given line, imparts rotation between the opposed ends of the spring body relative to each other and a consequent spiraling of said rods.

2. The spring apparatus of claim 1, wherein the spiraling of said rods defines a cylinder, the first coupling means enabling pivoting of said one of the opposed ends in a plane tangential to said cylinder at said first coupling means.

3. The spring apparatus of claim 2, wherein said rods are pivotable at a coupling point securing said spacer means to said respective rods in a second given plane tangential to said cylinder at said coupling point.

4. The spring apparatus of claim 2, wherein said spacer means comprises a plurality of spacers positioned at preselected intervals in the direction of said given line between said opposed ends.

5. The spring apparatus of claim 4, wherein said preselected intervals of the spacer means are equal.

6. The spring apparatus of claim 5, wherein said predetermined intervals of the rods are equal.

7. The spring apparatus of claim 6, wherein said rods are twisted in a spiraling angle when the spring body is in its relaxed, extended position.

8. The spring apparatus of claim 7, wherein said spacer means comprises a main body lying in a first given plane which is non-parallel to said axis.

9. The spring apparatus of claim 8, wherein said first given plane of the spacer means is substantially perpendicular to said axis.

10. The spring apparatus of claim 9, wherein said certain intervals equal said predetermined intervals of the rods throughout the length of said spring body.

11. The spring apparatus of claim 10, wherein said second coupling means comprises a plate (7) coupled to the other of the opposed ends of the spring means, and bearing means rotatably received between said load receiving member and said second coupling means.

12. The spring apparatus of claim 10, wherein said second coupling means enables pivoting of the other of the opposed ends in a plane tangential to said cylinder at said second coupling means.

13. The spring apparatus of claim 1, wherein said spacer means comprises a plurality of spacers positioned at preselected intervals in the direction of said given line between said opposed ends.

14. The spring apparatus of claim 1, wherein said predetermined intervals of the rods are equal.

15. The spring apparatus of claim 1, wherein said rods are twisted in a spiraling angle when the spring body is in its relaxed, extended position.

16. The spring apparatus of claim 1, wherein said spacer means comprises a main body lying in a first given plane which is non-parallel to said axis.

17. The spring apparatus of claim 16, wherein said first given plane of the spacer means is substantially perpendicular to said axis.

18. The spring apparatus of claim 1, wherein said certain intervals equal said predetermined intervals of the rods throughout the length of said spring body.

19. The spring apparatus of claim 1, wherein said second coupling means comprises a plate (7) coupled to the other of the opposed ends of the spring means, and bearing means rotatably received between said load receiving member and said second coupling means.

20. The spring apparatus of claim 1, wherein said second coupling means enables pivoting of the other of the opposed ends in a plane tangential to said cylinder at said second coupling means.

* * * * *